(No Model.)

A. T. SULLIVAN.
MOUSE TRAP.

No. 421,329. Patented Feb. 11, 1890.

Witnesses
L. S. Elliott.
E. W. Johnson.

Alonzo T. Sullivan
Inventor

By his Attorney

UNITED STATES PATENT OFFICE.

ALONZO T. SULLIVAN, OF MALCOLM, NEBRASKA.

MOUSE-TRAP.

SPECIFICATION forming part of Letters Patent No. 421,329, dated February 11, 1890.

Application filed October 31, 1889. Serial No. 328,768. (No model.)

*To all whom it may concern:*

Be it known that I, ALONZO T. SULLIVAN, a citizen of the United States of America, residing at Malcolm, in the county of Lancaster and State of Nebraska, have invented certain new and useful Improvements in Mouse-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in mouse-traps; and it consists in the improved construction hereinafter described and set forth, whereby a simple and efficient trap is provided that will effectually and automatically subserve its purpose, as fully explained.

Figure 1:
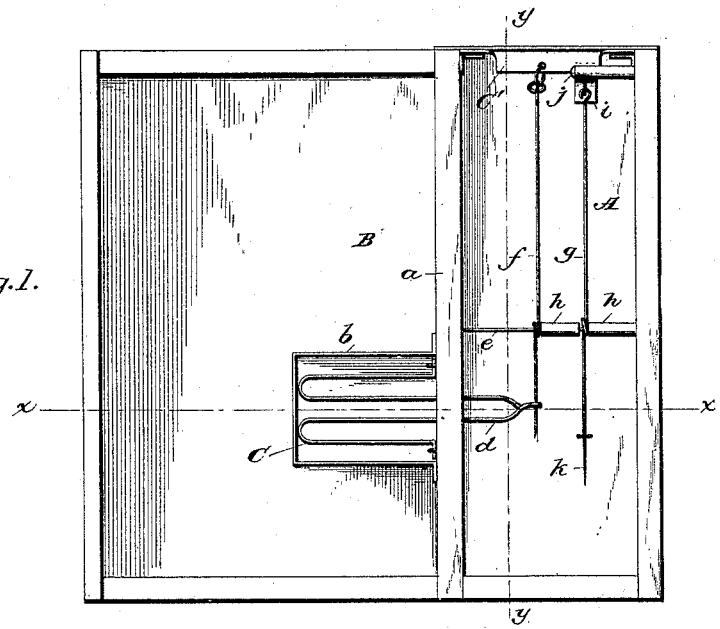
Figure 2:
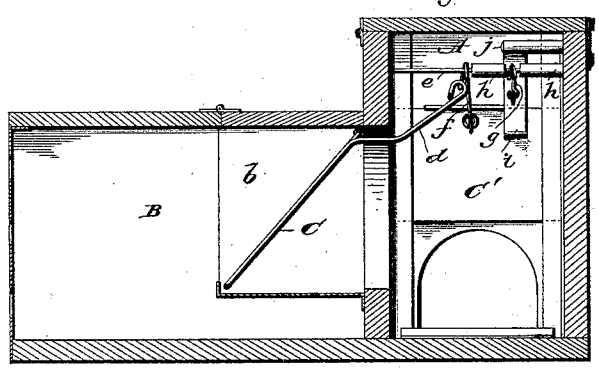
Figure 3:
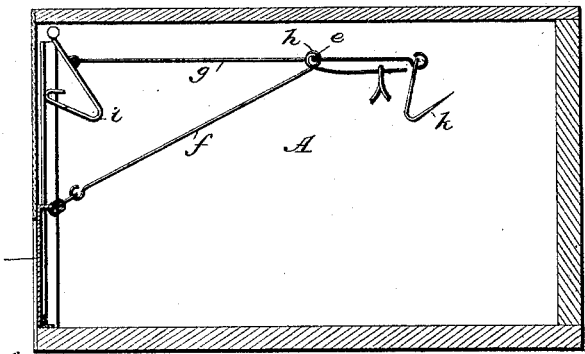

In the drawings, Figure 1 is a plan view of a trap embodying my improvements, the tops being removed. Fig. 2 is a transverse section of the dotted line $x\,x$ of Fig. 1, and Fig. 3 is a section of the line $y\,y$ of Fig. 1.

As represented, the trap consists of two compartments A B, separated from each other by the partition $a$, in which is formed a communicating-opening, the inner side of which is guarded by a metallic chute or platform $b$. Within this chute is located an inclined gate C, formed of wire, having its side portions bent horizontally outward to form pivots, while the central portion $d$ is extended through the opening in the form of a loop. A transverse rod $e$ is located in the upper portion of the chamber A, and has pivotally hung thereon two rods $f\,g$, spaced by means of blocks $h$ on the rod $e$. The rod $f$ has one end connected by a link to an ear located on a cut-off plate C', which slides vertically between side guides, so as to descend and close an opening located in the end wall of the compartment A. The free end of said rod engages the loop of the portion $d$ of the inclined gate. The other wire $g$ is connected at one end to a depending hook $i$, swinging pivotally from a pin $j$, located on the wall, and said hook is so located that when the plate C' is raised its flange will pass beneath the hook and become engaged thereby, so as to be supported in its elevated position. The other end of the rod $g$ carries a depending hook $k$, to which the bait is attached.

In use the mouse enters the compartment A through the opening therein, and as soon as he vibrates the hook $k$ in his efforts to get the bait the hook $i$ will be swung, so as to permit the plate C' to drop and make a captive of the mouse. As the only egress from said chamber is then through the opening leading into the chamber B, when the mouse passes through the same he will lift the gate and thereupon operate the rod $f$ to lift the plate and cause its re-engagement with the hook $i$, and the operation can be repeated indefinitely.

I am aware that prior to my invention traps have been devised wherein the general arrangement of parts was such that in tampering with the bait the cut-off plate was dropped, and a gate was provided to cause the plate to be elevated, so I therefore make no broad claim to such arrangement. My improvement contemplates a more simple arrangement and secures a more direct and positive action of parts. One side of the chamber B is provided with a perforated plate to enable it to be inspected without disturbing the lid.

I claim—

The combination, in a mouse-trap, of the chambers A B, communicating, as described, the latter being provided with chute and pivoted gate adapted to be raised by the animal passing beneath the same and provided with a loop extending into chamber A, a shaft $e$, ingress-opening, vertically-sliding plate for closing the same, pivoted hook $i$, rods $f\,g$, pivotally hung on shaft $e$, and connected, respectively, with vertically-sliding plate and hook $i$, rod $f$, engaging the loop of gate, and rod $g$, carrying bait-hook, substantially as set forth.

In testimony whereof I affix my signature in presence of two witnesses.

ALONZO T. SULLIVAN.

Witnesses:
J. CARPENTER,
M. H. WESTCOTT.